(12) United States Patent
Toda et al.

(10) Patent No.: US 7,222,694 B2
(45) Date of Patent: May 29, 2007

(54) CONTROL UNIT FOR ELECTRIC POWER STEERING

(75) Inventors: Yasuyosi Toda, Toyohashi (JP); Toshihisa Yamamoto, Anjo (JP); Naoki Matsuda, Handa (JP)

(73) Assignee: Denso Corporation, Kariya (JP)

( * ) Notice: Subject to any disclaimer, the term of this patent is extended or adjusted under 35 U.S.C. 154(b) by 213 days.

(21) Appl. No.: 10/776,196

(22) Filed: Feb. 12, 2004

(65) Prior Publication Data

US 2004/0159489 A1 Aug. 19, 2004

(30) Foreign Application Priority Data

Feb. 17, 2003 (JP) .............................. 2003-038173

(51) Int. Cl.
*B62D 5/04* (2006.01)

(52) U.S. Cl. ...................................... 180/444; 180/446

(58) Field of Classification Search ................ 180/443, 180/444, 446; 701/41, 42, 43
See application file for complete search history.

(56) References Cited

U.S. PATENT DOCUMENTS

| | | | |
|---|---|---|---|
| 4,771,843 A * | 9/1988 | Shimizu ..................... 180/446 |
| 4,800,974 A * | 1/1989 | Wand et al. ................. 180/446 |
| 5,355,315 A * | 10/1994 | Daido et al. ................... 701/41 |
| 5,889,378 A * | 3/1999 | Hayashi ....................... 318/541 |
| 5,992,556 A * | 11/1999 | Miller ........................ 180/446 |
| 6,622,576 B1 * | 9/2003 | Nakano et al. ......... 73/862.331 |
| 6,902,028 B2 * | 6/2005 | Takatsuka et al. .......... 180/446 |
| 2001/0026134 A1 * | 10/2001 | Fukumoto et al. .......... 318/430 |
| 2003/0079934 A1 * | 5/2003 | Kanda ........................ 180/446 |

FOREIGN PATENT DOCUMENTS

JP 2000-238652 9/2000

* cited by examiner

*Primary Examiner*—Anne Marie Boehler
(74) *Attorney, Agent, or Firm*—Posz Law Group, PLC (57) ABSTRACT

An electric power steering control unit is provided which is capable of detecting a motor current stably irrespective of a temperature variation to improve steering feelings. In this control unit, a temperature detecting circuit located in the vicinity of a motor current detecting circuit detects the motor current detecting circuit, and a CPU makes reference to output characteristic data on motor current detection output to temperature detection output stored in an EEPROM to correct the motor current detection output on the basis of the temperature detection output so that the motor current detection output corrected reaches a target current value to a motor driving circuit, thus driving an electric motor which operates a steering mechanism secondarily.

7 Claims, 6 Drawing Sheets

CONTROL UNIT FOR ELECTRIC POWER STEERING

BACKGROUND OF THE INVENTION

1) Field of the Invention

The present invention relates to a control unit for an electric power steering apparatus for use in a vehicle which accomplishes the reduction of driver's steering effort and the improvement of steering feelings.

2) Description of the Related Art

In an electric power steering apparatus, a rotating direction or rotational torque of an electric motor is controlled in accordance with an assist signal calculated on the basis of an output signal of a torsional torque sensor made to detect a torsional torque in a steering system, thereby reducing a steering load imposed on a vehicle driver. For example, for a high-response electric power steering apparatus, there has been proposed a technique in which, for generating a rotational torque needed, an actual motor current to be detected through the use of a motor current detecting circuit is controlled to reach a predetermined current value (for example, Japanese Patent Laid-Open No. 2000-238652).

However, the motor current detecting circuit shows a characteristic in which its output varies with temperature stemming from the temperature characteristic of an operational amplifier. Accordingly, there is a problem in which, if an electric motor is controlled on the basis of an output of such a motor current detecting circuit, the steering torque varies in accordance with a variation of temperature. In particular, in recent years, since the gain of the current detecting circuit has been higher than before, a minute variation of a current detection output stemming from a temperature variation can exert adverse influence on driver's steering feelings.

SUMMARY OF THE INVENTION

The present invention has been developed with a view to eliminating these problems, and it is therefore an object of the present invention to provide a control unit for an electric power steering apparatus capable of detecting a motor current stably irrespective of a temperature variation and of achieving the improvement of the driver's steering feelings.

For this purpose, in accordance with an aspect of the present invention, there is provided a control unit for electric power steering, comprising motor driving means for energizing (driving) an electric motor to operate a steering mechanism secondarily, motor current detecting means for detecting a current flowing in the electric motor and control means for implementing control so that a current detection output obtained by the motor current detecting means reaches a target current value to the motor driving means based on a steering torque in the steering mechanism, and further comprising temperature detecting means for detecting a temperature of the motor current detecting means and correction means for correcting an output of the motor current detecting means on the basis of an output of the temperature detecting means.

Thus, the temperature detecting means detects the temperature of the motor current detecting means, and the correction means corrects the output of the motor current detecting means on the basis of the output of the temperature detecting means, and further control means carries out control so that the output of the motor current detecting means after corrected agrees with a desired current value to the motor driving means determined on the basis of a steering torque in the steering mechanism, thereby driving the electric motor to operate the steering mechanism secondarily. This enables a correction of the temperature characteristic of the motor current detecting means to allow the motor current to be detected stably irrespective of a temperature variation, which contributes to the improvement of the driver's steering feelings.

In addition, the aforesaid electric steering control unit further comprises characteristic data storing means for storing output characteristic data of the motor current detecting means with respect to the output of the temperature detecting means, and the correction means corrects the output of the motor current detecting means on the basis of the output of the temperature detecting means and the output characteristic data of the motor current detecting means stored in the characteristic data storing means.

Thus, the characteristic data storing means stores the output characteristic data of the motor current detecting means with respect to the output of the temperature detecting means, and the correction means corrects the output of the motor current detecting means on the basis of the output of the temperature detecting means and the output characteristic data of the motor current detecting means stored in the characteristic data storing means, which enables the temperature characteristic of the motor current detecting means to be corrected on the basis of the output characteristic data.

Still additionally, in the electric power steering control unit, the characteristic data storing means stores characteristic data obtained on the basis of the output of the motor current detecting means with respect to the output of the temperature detecting means under two or more temperature conditions.

Accordingly, since the characteristic storing means stores the characteristic data obtained on the basis of the output of the motor current detecting means with respect to the output of the temperature detecting means under two or more temperature conditions, the correction means can correct the temperature characteristic of the motor current detecting means with high accuracy on the basis of the output characteristic data.

Yet additionally, in the electric power steering control unit, the characteristic data storing means is constructed with a data-rewritable non-volatile memory.

Therefore, after the measurement of the output characteristic of the motor current detecting means with respect to the output of the temperature detecting means, the obtained characteristic data can be written in the data-rewritable non-volatile memory.

Moreover, in the electric power steering control unit, the motor current detecting means and the temperature detecting means are constructed on the same semiconductor.

Thus, since the motor current detecting means and the temperature detecting means are constructed on the same semiconductor, the temperature output of the temperature detecting means can monitor the temperature of the motor current detecting means with accuracy.

Still moreover, in the electric power steering control unit, the temperature detecting means is located in the vicinity of the motor current detecting means.

Thus, since the temperature detecting means is located in the vicinity of the motor current detecting means, the temperature detecting means can detect the temperature of the motor current detecting means accurately.

Yet moreover, in the electric power steering control unit, on the semiconductor, the temperature detecting means is located in the close vicinity of the motor current detecting means.

Thus, since the temperature detecting means is located in the close vicinity of the motor current detecting means in the semiconductor, the temperature output of the temperature detecting means can monitor the temperature of the motor current detecting means more accurately.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

With reference to the drawings, a description will be given hereinbelow of an electric power steering control unit according to an embodiment of the present invention.

Figure 1:
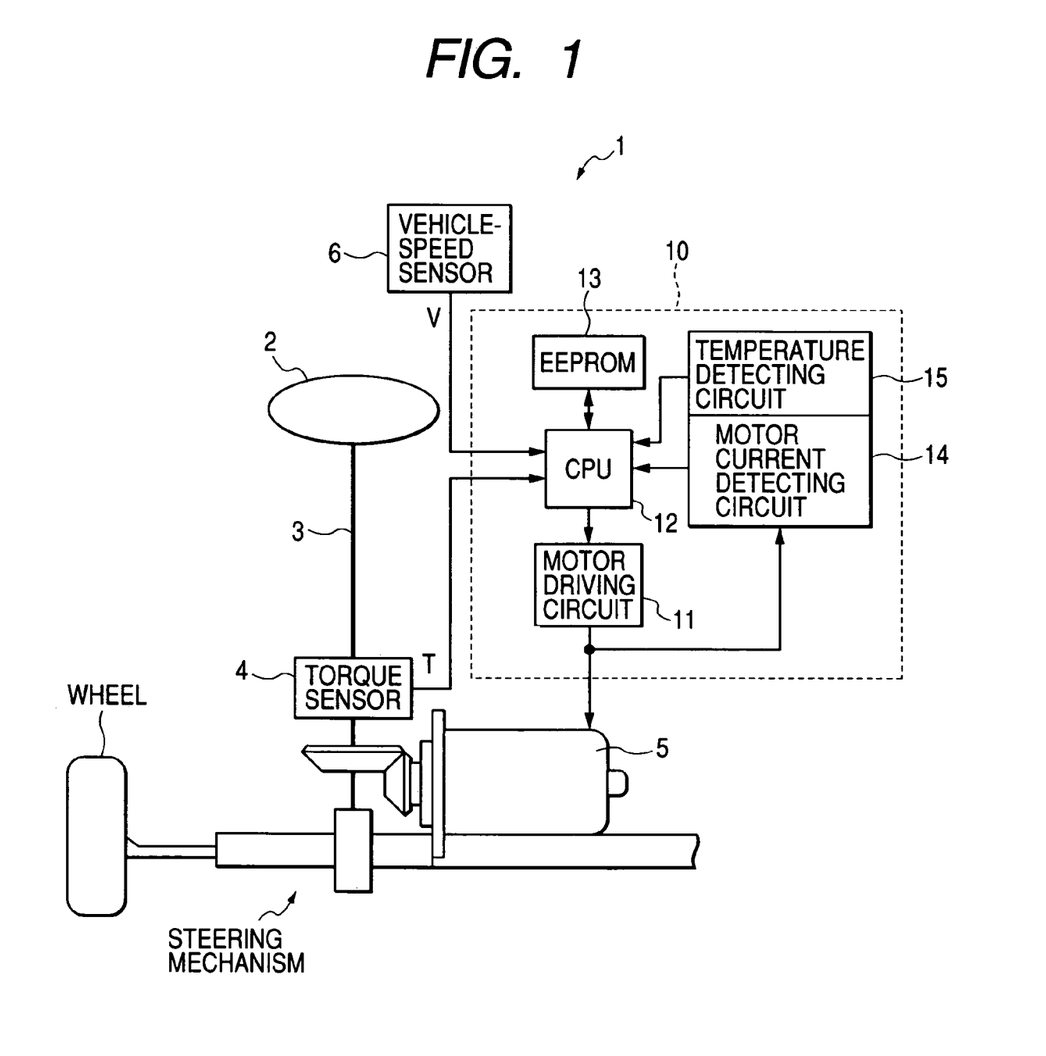
FIG. 1 is an illustration of the entire configuration of an electric power steering apparatus according to an embodiment of the present invention.
Figure 2:
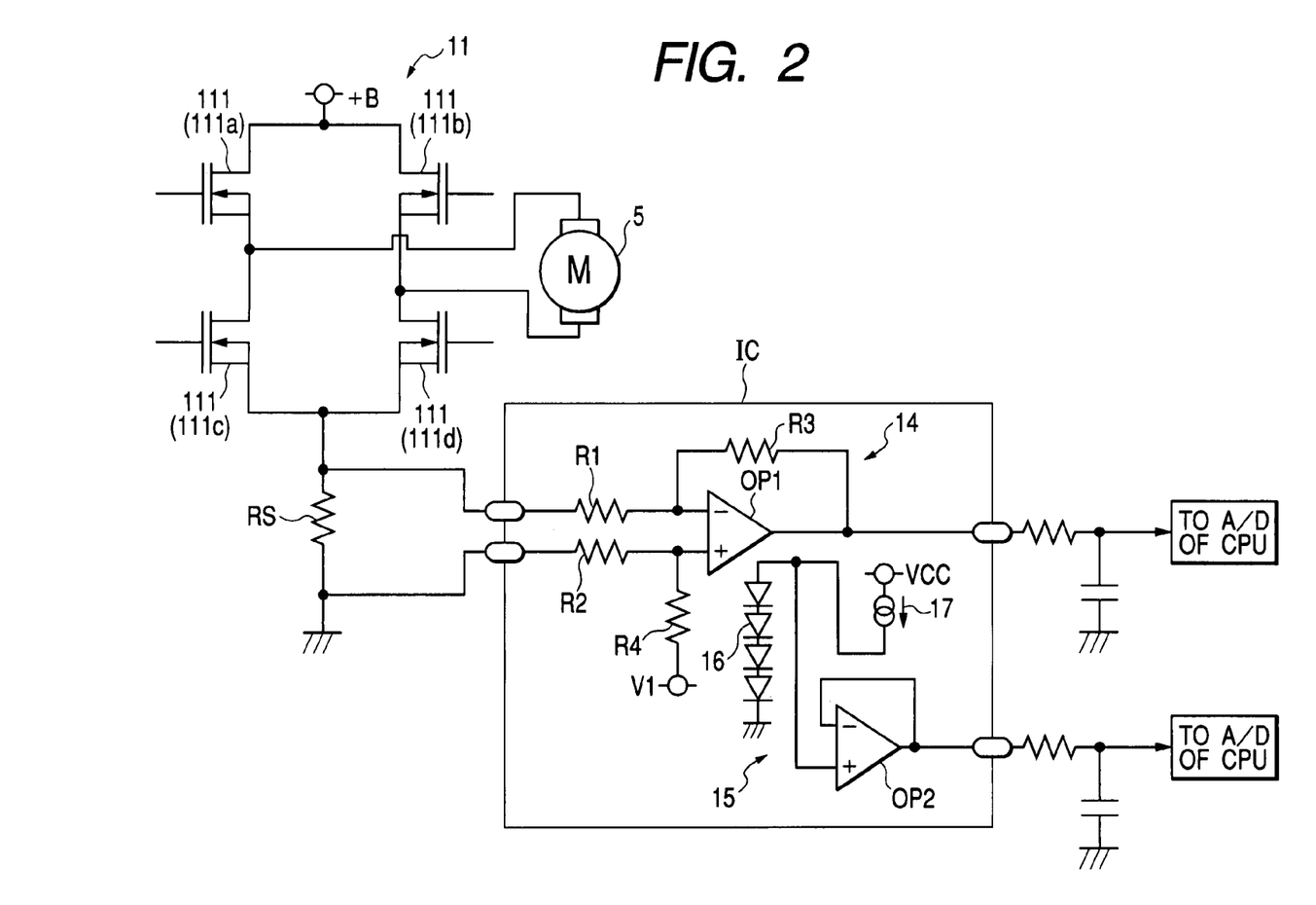
FIG. 2 is an illustration of an arrangement of hardware, principally showing a motor current detecting circuit and a temperature detecting circuit in a control system of the electric power steering apparatus.

FIG. 1 is an illustration of an entire configuration of an electric power steering apparatus 1, and FIG. 2 is an illustration of a hardware arrangement, principally showing a motor current detecting circuit 14 and a temperature detecting circuit 15 in a control system of the electric power steering apparatus 1.

As FIG. 1 shows, the electric power steering apparatus 1 according to this embodiment is made up of a torque sensor 4 for detecting a steering torque developing at a steering shaft 3 due to an operation of a steering wheel 2, an electric motor 5 for applying a driving force (power) to a steering mechanism to assist the steering effort of the steering wheel 2, an electronic control unit (which will be referred to hereinafter as an "ECU") 10 for controlling the drive of the electric motor 5, and others. This ECU 10 corresponds to the electric power steering control unit according to the present invention.

The torque sensor 4 is made to convert a steering torque into an electric signal for the detection thereof and, for example, it is constructed with a potentiometer. The output voltage of this torque sensor 4 varies in accordance with the magnitude of a steering torque developing in the steering shaft 3.

The ECU 10 is composed of a motor driving circuit 11, a microprocessor (which will be referred to hereinafter as a "CPU") 12, an EEPROM 13, a motor current detecting circuit 14, a temperature detecting circuit 15, and others.

In the present invention, the motor driving circuit 11 corresponds to the motor driving means, the CPU 12 to the control means, the EEPROM 13 to the characteristic data storing means and the non-volatile memory, the motor current detecting circuit 14 to the motor current detecting means, and the temperature detecting circuit 15 to the temperature detecting means.

The motor driving circuit 11 is an H-type bridge circuit constructed using four FETs 111 (first FET 111a, second FET 111b, third FET 111c and fourth FET 111d) as shown in FIG. 2, and it is made to PWM-drive the electric motor 5 on the basis of a motor drive signal (PWM signal) outputted from a drive signal outputting circuit (not shown) in accordance with a current instruction value calculated in the CPU 12.

The CPU 12 is constructed with a one-chip microcomputer formed by integrating a CPU, ROM, RAM, input/output port, system controller and others constituting a microcomputer system on one chip. The CPU 12 calculates a target current value for the drive of the motor 5 on the basis of a torque signal T inputted from the torque sensor 4 and a vehicle-speed signal V inputted from a vehicle-speed sensor 6 (see FIG. 1). Moreover, it corrects the temperature characteristic of a current detection output from the motor current detecting circuit 14 and carries out the PID feedback control or the like so that the current detection output after corrected becomes the target current value.

The EEPROM 13 is an electrically data-rewritable non-volatile memory and stores characteristic data of a current detection output of the motor current detecting circuit 14 with respect to a temperature detection output of the temperature detecting circuit 15. The writing of characteristic data in the EEPROM 13 to be made at a shipment inspection will be mentioned later.

The motor current detecting circuit 14 detects a current flowing the motor 5 on the basis of a voltage across a current detection shunt resistor RS connected to a low-potential side of the motor driving circuit 11, and outputs, as a voltage signal (motor current signal), a current detection result corresponding to the detected current value to the CPU 12. In more detail, the motor current detecting circuit 14 is composed of an operational amplifier OP1, a first resistor R1 connected between one end (motor driving circuit 11 side) of the shunt resistor RS and an inverting input terminal of the operational amplifier OP1, a second resistor R2 connected between the other end (ground side) of the shunt resistor RS and a non-inverting input terminal of the operational amplifier OP1, a third resistor R3 connected between the inverting input terminal of the operational amplifier OP1 and an output terminal of the operational amplifier OP1, and a fourth resistor R4 connected between the non-inverting input terminal of the operational amplifier OP1 and an electric potential V1. This is so-called a differential amplification circuit. In this embodiment, the resistance values of the resistors R1 and R2 are set to be equal to each other, and the resistance values of the resistors R3 and R4 are set to be equal to each other. However, the present invention is not necessarily limited to these resistance values of the resistors R1 to R4.

The temperature detecting circuit 15 is located in the vicinity of the motor current detecting circuit 14 in a state integrated in the IC package of the motor current detecting circuit 14 (in the same IC package as that of the motor current detecting circuit 14), and outputs a temperature detection result as a voltage signal to the CPU 12. In more detail, the temperature detecting circuit 15 is composed of a temperature detection diode group 16 whose cathode side is connected to the ground, a constant-current circuit 17 connected at one end to a power supply voltage VCC and connected at the other end to the anode side of the diode group 16 for supply a constant current to the diode group 16, and an operational amplifier OP2. In this arrangement, the diode group 16 is formed by connecting a plurality of (for example, four) diodes. Moreover, the anode side of the diode group 16 is connected to the non-inverting input terminal of the operational amplifier OP2 and the inverting input terminal of the operational amplifier OP2 is connected to the output terminal thereof, thus detecting and outputting an electric potential of the anode side of the diode group 16 from the operational amplifier OP2. Still moreover, since the characteristics of the diodes constituting the diode group 16 vary in accordance with a temperature variation, the operational amplifier OP2, i.e., the temperature detecting circuit 15, generates a detection output corresponding to the temperature.

In this case, any arrangement of the temperature detecting circuit 15 is also acceptable provided that it can monitor the temperature of the current detecting circuit 14.

In this connection, since there is a need to accurately detect a temperature variation in the vicinity of the operational amplifier OP1 in order to correct the temperature drift of the output offset voltage of the operational amplifier OP1 in the motor current detecting circuit 14, it is preferable that the diode group 16 is placed as close to the operational amplifier OP1 as possible.

Secondly, a description will be given hereinbelow of the relationship between the detection output offset voltage of the motor current detecting circuit 14 and the detection output of the temperature detecting circuit 15. The detection output offset voltage of the motor current detecting circuit 14 signifies an output voltage from the motor current detecting circuit 14 when the actual current flowing in the motor driving circuit 11 is at 0 [A], and this detection output offset voltage varies with temperature as shown in FIG. 3A.

Figure 3A:
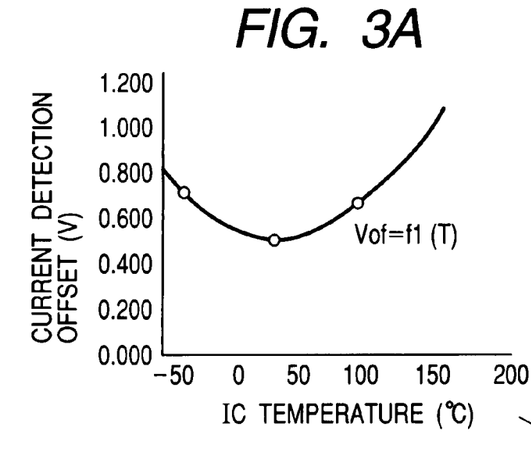
FIG. 3A is a graphic illustration of one example of the relationship between an actual temperature and a current detection output offset voltage.

The actual temperature of the IC in which the current detecting circuit 14 and the temperature detecting circuit 15 are put in a state integrated and the current detection output offset voltage of the current detecting circuit 14 show the relationship, for example, shown in the graph (a curve indicated by a solid line) of FIG. 3A. In this case, the current detection output offset voltage Vof can be expressed as Vof=f1(T) as a function of the temperature T (f1 represents a predetermined function).

Figure 3B:
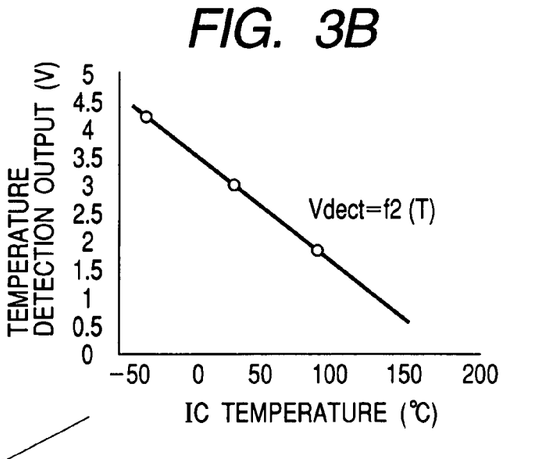
FIG. 3B is a graphic illustration of one example of the relationship between an actual temperature of an IC and a current detection output.

On the other hand, the actual temperature of the IC and the temperature detection output of the temperature detecting circuit 15 have the relation, for example, shown in the graph (a straight line indicated by a solid line) of FIG. 3B. In this case, the temperature detection output Vdect can be expressed as Vdect=f3(T) as a function of the temperature T (f2 denotes a predetermined function).

If the actual temperature T is removed from the aforesaid two equations, the current detection output offset voltage Vof can be expressed as Vof=f3 (Vdect) as a function of the temperature detection output Vdect (f3 depicts a predetermined function). Moreover, the relationship between the current detection output offset voltage Vof and the temperature detection output Vdect is expressed, for example, as shown in the graph (a curve indicated by a solid line) of FIG. 3C.

Accordingly, if the current detection output offset voltage of the current detecting circuit 14 and the temperature detection output of the temperature detecting circuit 15 are measured in advance under a plurality of arbitrary IC temperature conditions and the measurement results are stored as characteristic data in a memory, the current detection output offset voltage Vof corresponding to the temperature detection output Vdect is obtainable.

Figure 3C:
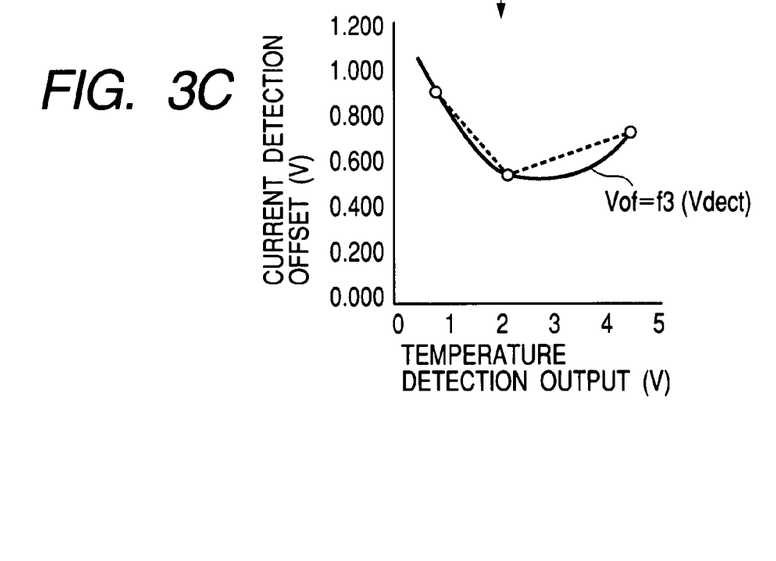
FIG. 3C is a graphic illustration of one example of the relationship between a current detection output offset voltage and a temperature detection output.

In this embodiment, the current detection output offset voltage and the temperature detection output are measured under three temperature conditions different from each other at the shipment inspection of the ECU 10 (see circle marks on the graphs of FIGS. 3A and 3B), and these measurement results are electrically written in the EEPROM 13 as the characteristic data on the current detection outputs relative to the temperature detection outputs. With respect to the measured temperature detection outputs other than those under the three temperature conditions, the corresponding current detection output offset voltages are obtainable through the linear interpolation. FIG. 3C shows an example in which the linear interpolation is carried out in the form of a sequential line as indicated by a dotted line. Incidentally, as the measurement results are acquired under more temperature conditions, the characteristic data closer to the true characteristic graph indicated by a solid line in FIG. 3C are attainable.

In recent years, there is a type in which an EEPROM is built in the interior of an IC, and in the case of the employment of such an IC, it is possible that the current detection output offset voltage values and the temperature detection values at that time are previously written therein at the IC inspection, concretely, at low-temperature, room-temperature and high-temperature inspections.

In this connection, for example, the temperature conditions at the shipment inspection of the ECU 10 are set at three points of a low temperature (a minimum temperature to be expected in an actually using state; for example, −40° C.), a normal temperature (for example, 25° C.) and a high temperature (a maximum temperature to be expected in an actually using state; for example, 85° C.).

Furthermore, a description will be given hereinbelow of an operation of the electric power steering apparatus 1 configured as described above.

The motor current detecting circuit 14 detects a current flowing in the motor 5 on the basis of a voltage across the current detection shunt resistor RS connected to the low-potential side of the motor driving circuit 11 and outputs a current detection result corresponding to the detection current value to the CPU 12 in the form of a voltage signal. When inputted to the CPU 12, the current detection output is converted through a built-in A/D converter into a digital value.

On the other hand, the temperature detection circuit 15 located in the vicinity of the motor current detecting circuit 14 outputs a temperature detection result to the CPU 12 in the form of a voltage signal. When inputted to the CPU 12, the temperature detection output is converted through an built-in A/D converter into a digital value.

The CPU 12 makes reference to the characteristic data on the current detection output relative to the temperature detection output, which is stored in the EEPROM 13 in advance, to put the data in its own RAM and obtains a current detection output offset voltage corresponding to the temperature detection output on the basis of the data stored therein. Then, the CPU 12 makes a correction on the current detection output through the use of this current detection output offset voltage, and executes the feedback control such as PID on the basis of the difference between a current instruction value calculated on the basis of a torque signal T and a vehicle speed signal V and the current detection output after corrected, thereby setting an appropriate drive current duty ratio for controlling the motor driving circuit 11.

As obvious from the above description, according to this embodiment, the temperature detecting circuit 15 placed near the motor current detecting circuit 14 detects the temperature, and the CPU 12 makes reference to the output characteristic data on the motor current detection output to the temperature detection output stored in the EEPROM 13 to correct the motor current detection output on the basis of the temperature detection output for executing the control so that the motor current detection output corrected agrees with a target current value to the motor driving circuit 11 determined on the basis of a steering torque in the steering mechanism, thus driving the electric motor 5 which operates the steering mechanism secondarily. Therefore, the temperature characteristic of the motor current detecting circuit 14 can be corrected to detect the motor current stably irrespective of a temperature variation so that the driver's steering feelings are improvable.

In addition, according to this embodiment, since the EEPROM 13 is made to store the characteristic data obtained on the basis of the outputs of the motor current detecting circuit 14 with respect to the outputs of the temperature detecting circuit 15 under two or more temperature conditions, the CPU 12 can correct the temperature characteristic of the motor current detecting circuit 14 with high accuracy on the basis of the output characteristic data without detecting the absolute temperatures.

Still additionally, according to this embodiment, since the characteristic data storing means is constructed using the EEPROM 13 which is a data-rewritable non-volatile memory, it is possible that, at the shipment inspection of the ECU 10, the output characteristic of the motor current detecting circuit 14 is measured with respect to the output of the temperature detecting circuit 15 and the obtained characteristic data is then electrically written therein.

Yet additionally, in the case of an EEPROM-incorporated IC, the aforesaid characteristic data can be stored in advance at the IC shipment inspection.

Moreover, according to this embodiment, since the motor current detecting circuit 14 and the temperature detecting circuit 15 are formed on the same IC (semiconductor), the temperature of the motor current detecting circuit 14 can accurately be monitored through the temperature output of the temperature detecting circuit 15.

Still moreover, according to this embodiment, since the temperature detecting circuit 15 is placed in the close vicinity of the motor current detecting circuit 14 on the semiconductor, the temperature of the motor current detecting circuit 14 can more accurately be monitored through the temperature output of the temperature detecting circuit 15.

It should be understood that the present invention is not limited to the above-described embodiment, and that it is intended to cover all changes and modifications of the embodiment of the invention herein which do not constitute departures from the spirit and scope of the invention.

For example, although in the above-described embodiment the current detection output and temperature detection output measurement temperature conditions are set at three points at the shipping inspection of the ECU 10, in a case in which the current detection output offset voltage characteristic relative to the actual temperature becomes a linear characteristic, it is also acceptable that the temperature condition is set at only two points. In short, the current detection output and the temperature detection output can be measured under two or more temperature conditions.

In addition, although in the above-described embodiment the EEPROM 13 is employed as the characteristic data storing means, it is also appropriate to employ other types of non-volatile memories such as a flash memory. Alternatively, in a case in which an EEPROM can be incorporated into an IC in the same process, it is also possible to store the data in the EEPROM incorporated into the IC.

Still additionally, FIG. 2 shows one example of the circuit arrangement of the temperature detecting circuit 15, and it is also possible to employ any means which can exhibit the equivalent temperature detection function.

Figure 4:
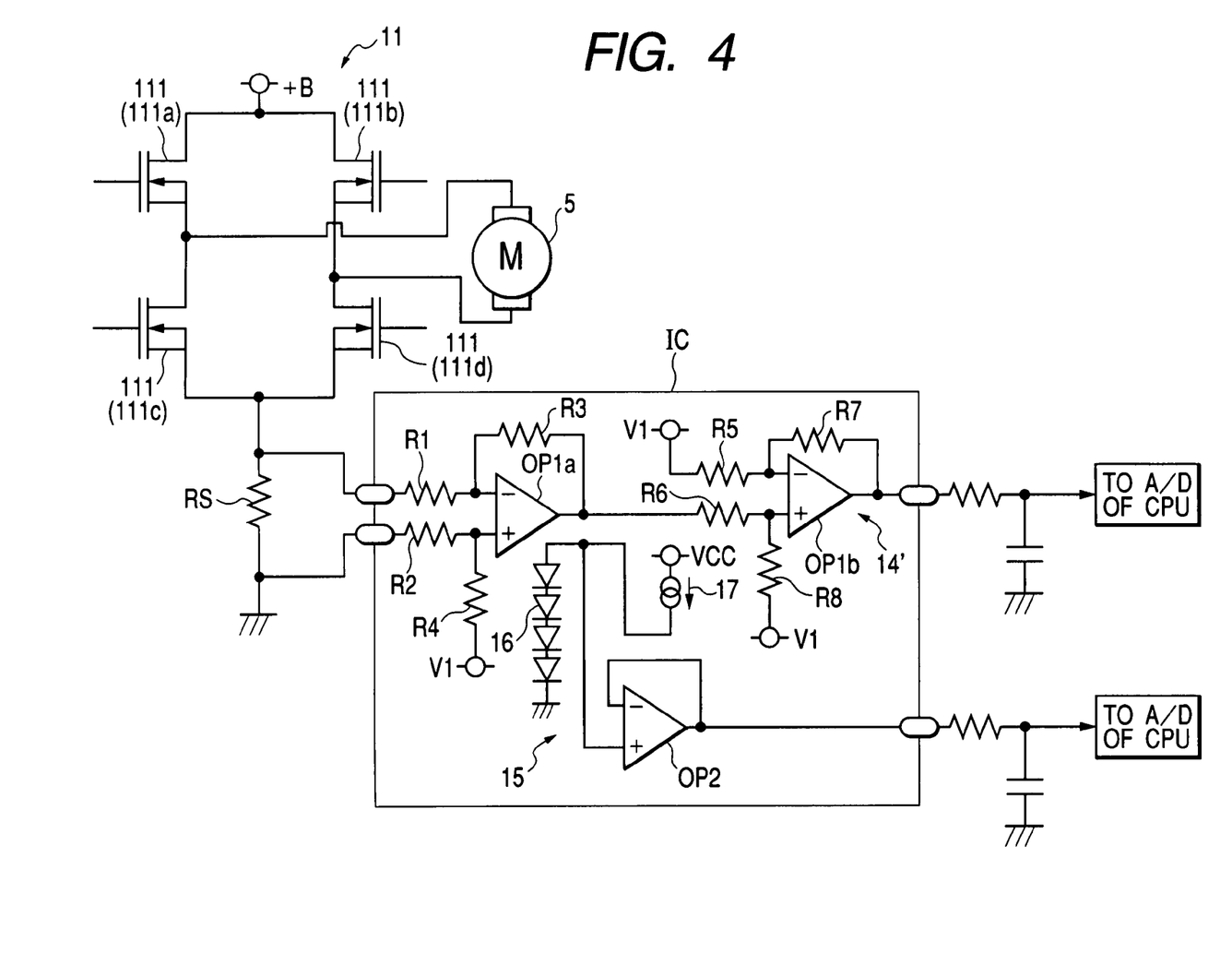
FIG. 4 is an illustration of a hardware arrangement according to a modification of the motor current detecting circuit.

Yet moreover, as the arrangement of the operational amplifiers in the motor current detecting circuit 14, not only the one-stage amplification circuit but also two or more stage amplification circuit are employable. FIG. 4 shows a hardware arrangement according to a modification in which a motor current detecting circuit 14' has two-stage amplification arrangement using two operational amplifiers OP1*a* and OP1*b*.

Figure 5:
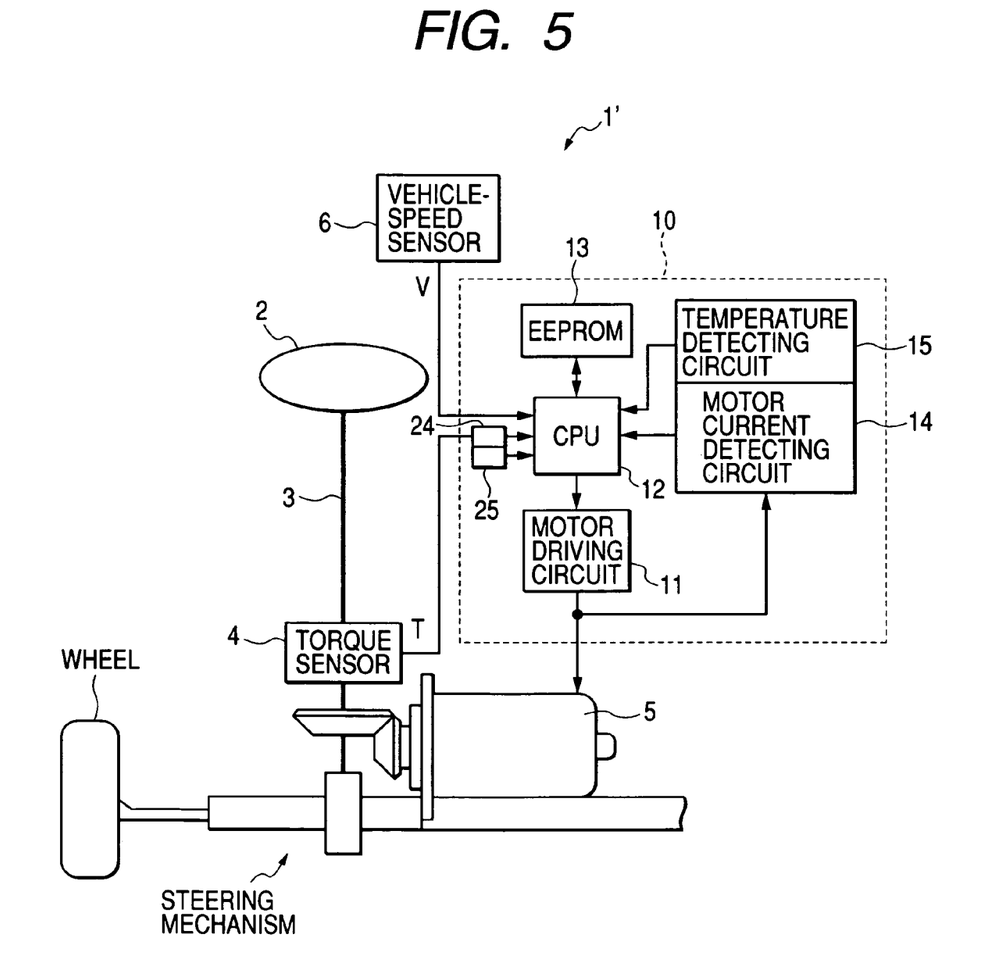
FIG. 5 is an illustration of the entire configuration of an electric power steering apparatus according to a modification, where a temperature detecting circuit is located in the vicinity of a torque sensor output interface circuit.
Figure 6:
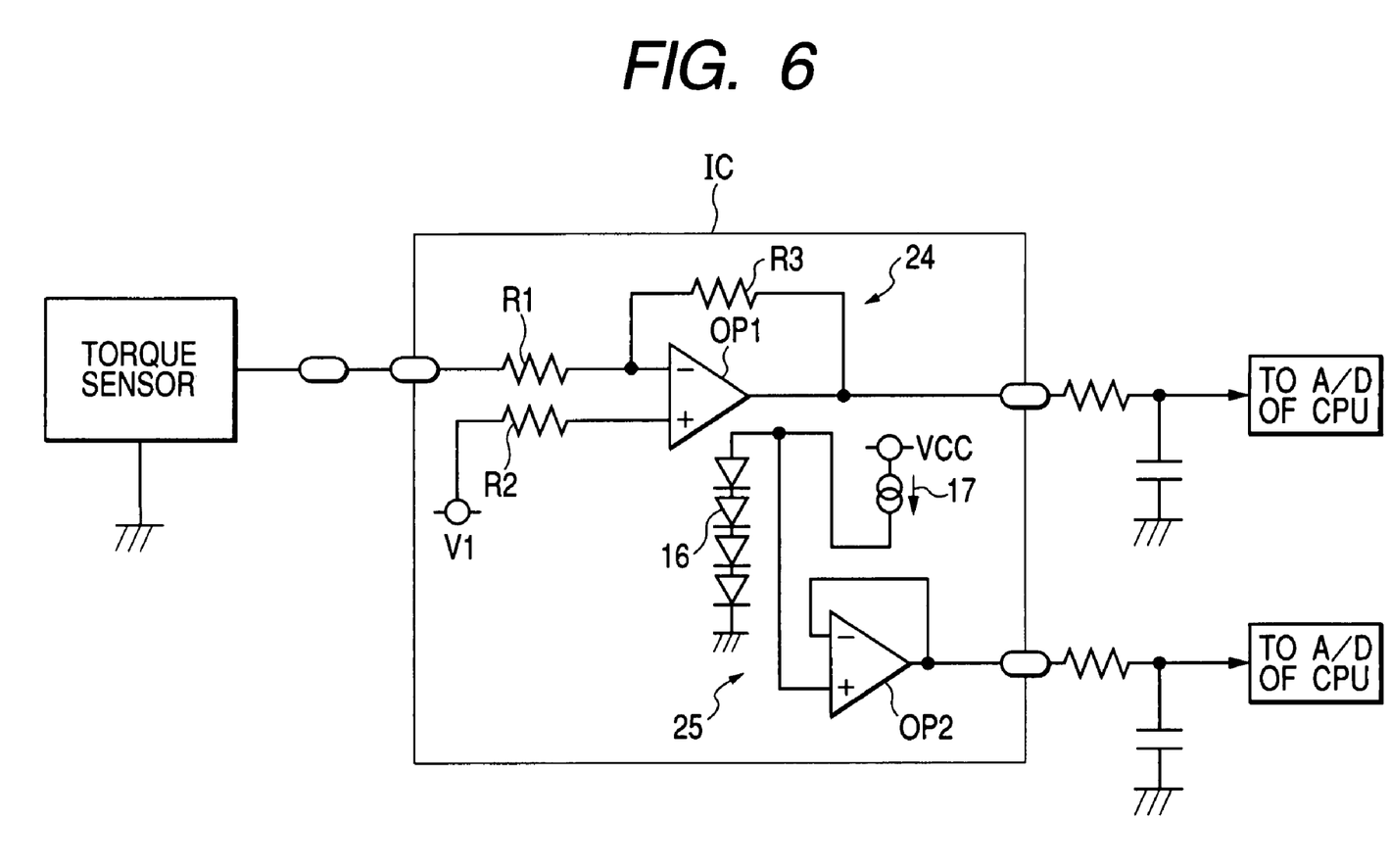
FIG. 6 is an illustration of a hardware arrangement, principally showing the torque sensor output interface circuit and the temperature detecting circuit in the modification shown in FIG. 5.

Furthermore, the above-mentioned correction of the temperature characteristic is applicable to not only the detection of the motor current but also, for example, the correction of an offset voltage value of a neutral point (signifying a state in which no torque acts) of an operational amplifier of a torque sensor input portion. In a case in which the correction of the temperature characteristic is also applied to the torque sensor input, the stable motor current control is similarly feasible, which achieves a further improvement of the driver's steering feelings. FIG. 5 entirely shows a configuration of an electric power steering apparatus 1' according to a modification in which a temperature detecting circuit 25 is placed in the vicinity of a torque sensor output interface circuit 24, to which a torque sensor signal is inputted from a torque sensor, to correct the offset voltage value. FIG. 6 is an illustration of a hardware arrangement, principally showing the torque sensor output interface circuit 24 and the temperature detecting circuit 25.

Although in this embodiment the temperature detecting circuit 15 is placed in the vicinity of the motor current detecting circuit 14 in a state integrated in the same IC package as that of the motor current detecting circuit 14, the present invention is not limited to this, but it is also possible that the temperature detecting circuit 15 is placed at any portion in the ECU 10 without being integrated in the same IC package as that of the motor current detecting circuit 14. In this case, the temperature detecting circuit 15 estimates and detects the temperature of the motor current detecting circuit 14. This can provide the effects similar to those of this embodiment.

As described above, according to the present invention, the temperature detecting means located in the vicinity of the motor current detecting means detects the temperature thereof, and the correction means corrects the output of the motor current detecting means on the basis of the output of the temperature detecting means, and the control means carries out the control so that the output of the motor current detecting means after corrected reaches a target current value for the motor driving means based on a steering torque in the steering mechanism, thus driving the electric motor which auxiliary-operates the steering mechanism. Therefore, the temperature characteristic of the motor current detecting means can be corrected to detect the motor current stably irrespective of a temperature variation, thereby improving the driver's steering feelings. Moreover, in a case in which the correction of the temperature characteristic is also made on the torque sensor input, the stable motor current control is likewise feasible, which achieves further improvement of the driver's steering feelings.

What is claimed is:

1. A control unit for electric power steering, comprising:
   motor driving means for energizing an electric motor to operate a steering mechanism secondarily;
   motor current detecting means having an amplifier amplifying a voltage across a shunt resistor through which a motor current of said electric motor flows to output a current detection output indicating a value of said motor current; and
   control means for implementing control so that said current detection output obtained by said motor current detecting means reaches a target current value to said motor driving means determined on the basis of a steering torque in said steering mechanism;
   temperature detecting means for detecting a temperature of said motor current detecting means; and
   correction means for correcting the current detection output of said motor current detecting means on the basis of an output of said temperature detecting means;
   wherein said motor current detecting means is integrated in an integrated circuit package, and said temperature detecting means is integrated in said integrated circuit package so as to be situated in the vicinity of said amplifier of said motor current detecting means.

2. The unit according to claim 1, further comprising characteristic data storing means for storing output characteristic data on said motor current detecting means with respect to the output of said temperature detecting means, said correction means correcting the output of said motor current detecting means on the basis of the output of said temperature detecting means and said output characteristic data on said motor current detecting means stored in said characteristic data storing means.

3. The unit according to claim 2, wherein said characteristic data storing means stores characteristic data obtained on the basis of the outputs of said motor current detecting means with respect to the outputs of said temperature detecting means under two or more temperature conditions.

4. The unit according to claim 2, wherein said characteristic data storing means is constructed with a data-rewritable non-volatile memory.

5. The unit according to claim 1, wherein said motor current detecting means and said temperature detecting means are arranged on the same semiconductor.

6. The unit according to claim 1, wherein said temperature detecting means is placed in the vicinity of said motor current detecting means.

7. The unit according to claim 5, wherein, on said semiconductor, said temperature detecting means is located in the close vicinity of said motor current detecting means.

* * * * *